United States Patent
Lee (12)

(10) Patent No.: US 11,556,604 B2
(45) Date of Patent: Jan. 17, 2023

(54) ELECTRONIC DEVICE AND SEARCH KEYWORD PROCESSING METHOD THEREOF

(71) Applicant: SAMSUNG ELECTRONICS CO., LTD., Suwon-si (KR)

(72) Inventor: Seonho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 118 days.

(21) Appl. No.: 16/251,390

(22) Filed: Jan. 18, 2019

(65) Prior Publication Data

US 2019/0228045 A1 Jul. 25, 2019

(30) Foreign Application Priority Data

Jan. 22, 2018 (KR) .................. 10-2018-0007808

(51) Int. Cl.
*G06F 16/9538* (2019.01)
*G06F 16/9532* (2019.01)
(Continued)

(52) U.S. Cl.
CPC ........ *G06F 16/9538* (2019.01); *G06F 16/835* (2019.01); *G06F 16/951* (2019.01);
(Continued)

(58) Field of Classification Search
CPC ............. G06F 16/9538; G06F 16/9532; G06F 16/951; G06F 16/9535; G06F 16/954; G06F 16/83; G06F 16/95
(Continued)

(56) References Cited

U.S. PATENT DOCUMENTS

2005/0071328 A1 3/2005 Lawrence
2007/0198340 A1 8/2007 Lucovsky et al.
(Continued)

FOREIGN PATENT DOCUMENTS

| KR | 10-2013-0047882 | 5/2013 |
|----|-----------------|--------|
| WO | 2005/033979 | 4/2005 |
| WO | 2014/187218 | 11/2014 |

OTHER PUBLICATIONS

Saleema Amershi et al: "CoSearch", The 26th Annual CHI Conference on Human Factors in Computing Systems, CHI 2008 : Conference Proceedings ; Apr. 5-10, 2008 In Florence, Italy, Apr. 6, 2008 (Apr. 6, 2008), pp. 1647-1656; ISBN: 978-1-60558-011-1 (Year: 2008).*

(Continued)

*Primary Examiner* — Hosain T Alam
*Assistant Examiner* — Tracy M McGhee
(74) *Attorney, Agent, or Firm* — Nixon & Vanderhye P.C.

(57) ABSTRACT

According to various embodiments of the present disclosure, an electronic device includes a display, a communication circuit, a processor operatively connected to the display and the communication circuit, and a memory operatively connected to the processor, wherein the memory is configured to store a web browser including a uniform resource locator (URL) address bar and at least one application program, wherein the memory is further configured to store instructions that, when executed by the processor, cause the electronic device to be configured to: display a first webpage including a search box, using the web browser, on the display, receive at least one search text through the search box and/or the URL address bar, transmit the at least one search text to a first external server associated with the first webpage via the communication circuit, receive a first search result associated with the search text from the first external server; display the first search result on the display, (Continued)

receive a user input for selecting a second webpage or an application program for using the search text, transmit data associated with the search text to a second external server associated with the second webpage or the application program via the communication circuit, without further receiving the search text, receive a second search result associated with the search text from the second external server, and display the second search result on the display.

16 Claims, 9 Drawing Sheets

(51) Int. Cl.
    *G06F 16/951*     (2019.01)
    *G06F 16/9535*     (2019.01)
    *G06F 16/954*     (2019.01)
    *G06F 16/835*     (2019.01)

(52) U.S. Cl.
    CPC ........ *G06F 16/954* (2019.01); *G06F 16/9532* (2019.01); *G06F 16/9535* (2019.01)

(58) Field of Classification Search
    USPC .......................................................... 707/706
    See application file for complete search history.

(56) References Cited

U.S. PATENT DOCUMENTS

| | | |
|---|---|---|
| 2009/0282022 A1 | 11/2009 | Bennett |
| 2010/0082604 A1* | 4/2010 | Gutt .................... G06F 16/3326 707/E17.014 |
| 2011/0055185 A1 | 3/2011 | Bitan et al. |
| 2012/0284293 A1 | 11/2012 | Nierenberg |
| 2014/0351236 A1* | 11/2014 | Zhu ....................... G06F 16/951 707/709 |
| 2016/0260151 A1 | 9/2016 | Dehaven et al. |
| 2016/0357756 A1 | 12/2016 | Gelfand et al. |
| 2017/0024424 A1 | 1/2017 | Almohizea |
| 2017/0212962 A1 | 7/2017 | Choi et al. |

OTHER PUBLICATIONS

Saleema Amershi et. al., 1. CoSearch: A System for Co-located Collaborative Web Search. Apr. 5, 2008 CHI 2008 Proceedings Collaboration and Cooperation, 10 pgs. 2008.*

International Search Report dated Apr. 12, 2019 in counterpart International Patent Application No. PCT/KR2019/000732.

Extended Search Report dated Apr. 3, 2019 in counterpart European Patent Application No. 19153009.6.

Zhu, Dengya et al, "Determining and Satisfying Search Users Real Needs via Socially Constructed Search Concept Classification", Digital Ecosystems and Technologies Conference, 2007. DEST '07. Inaugural IEEE-IES, IEEE, PI, Feb. 1, 2007, pp. 404-409.

Amershi, Saleema et al., "CoSearch", The 26th Annual CHI Conference on Human Factors in Computing Systems, CHI 2008 : Conference Proceedings; Apr. 5-10, 2008 In Florence, Italy, Apr. 6, 2008, pp. 1647-1656.

European Office Action dated Oct. 5, 2020 for EP Application No. 19153009,6.

Convolutional Neural Network; Google Search; 2 pgs; Dec. 29, 2020 https://www.google.com/search?q-convolutional+neural+network&rlz-1C1GCEB.

India Examination Report dated Jun. 17, 2021 for IN Application No. 202037016890.

Korean Office Action dated Apr. 5, 2022 for KR Application No. 10-2018-0007808.

Saleema Amershi et. al., 1. CoSearch: A System for Co-located Collaborative Web Search. Apr. 5, 2008 CHI 2008 Proceedings Collaboration and Cooperation, 10 pgs.

Korean Office Action dated Sep. 13, 2022 for KR Application No. 10-2018-0007808.

* cited by examiner

⟨420⟩

⟨430⟩

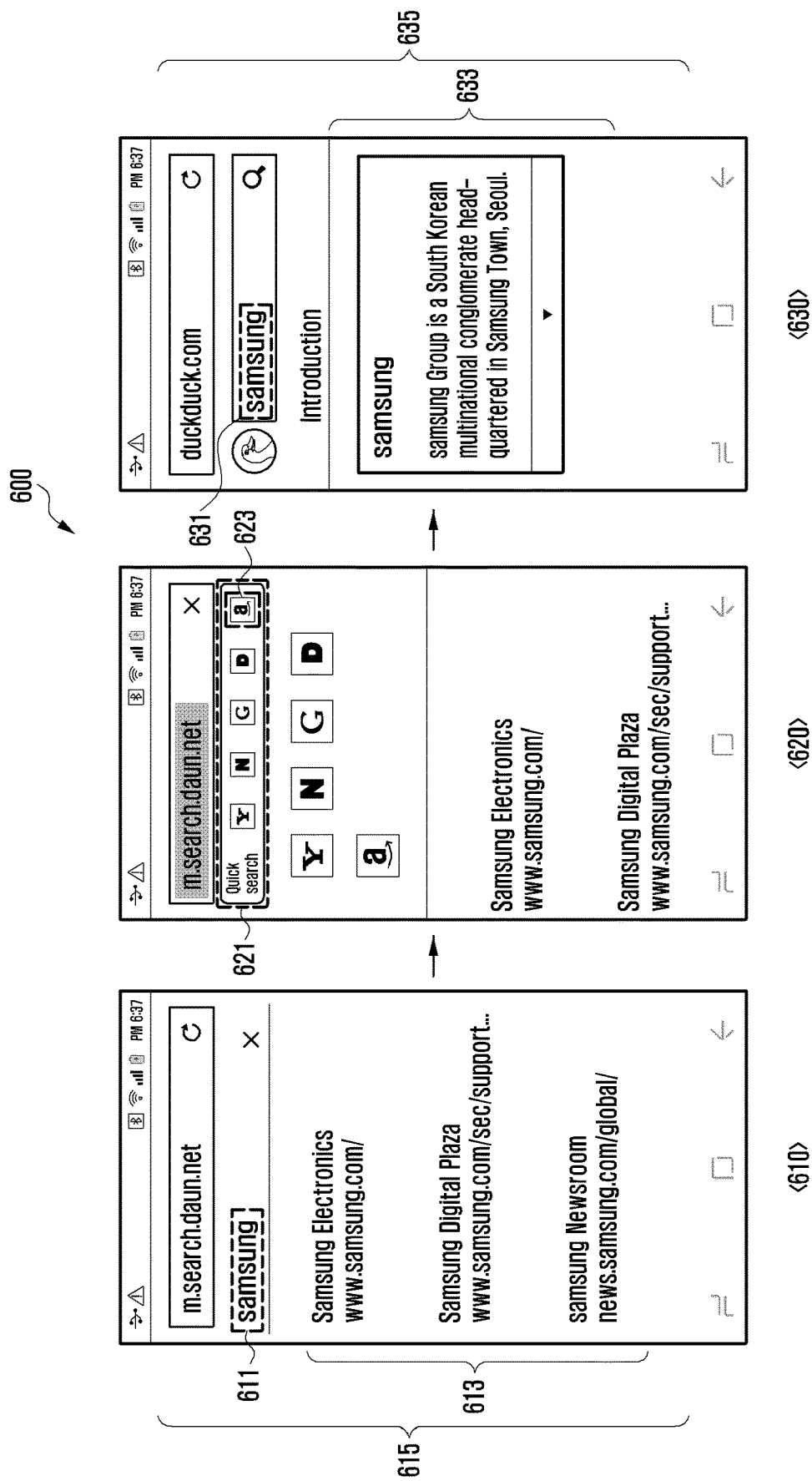

ELECTRONIC DEVICE AND SEARCH KEYWORD PROCESSING METHOD THEREOF

CROSS-REFERENCE TO RELATED APPLICATION

This application is based on and claims priority under 35 U.S.C. § 119 to Korean Patent Application No. 10-2018-0007808, filed on Jan. 22, 2018, in the Korean Intellectual Property Office, the disclosure of which is incorporated by reference herein in its entirety.

TECHNICAL FIELD

The present disclosure relates to an electronic device and a search keyword processing method thereof.

BACKGROUND

Portable electronic devices have evolved toward integrating various functions. One of the essential functions of such electronic devices is a mobile Internet-based information search function, the importance of which is increasing.

The search function of an electronic device operates in such a way of searching the Internet for information corresponding to a search keyword that a user enters into a search box of a website with a search function.

The above method is laborious because a user who is searching for information under a keyword on one website and would like to try the search on another website has to enter the address of the other website to access the website and then enter the same keyword on the changed website to retrieve the information. This means that the same keyword has to be entered for every try on different websites and is inconvenient for the user.

SUMMARY

Example embodiments of the present disclosure provide an electronic device and search keyword processing method thereof that is capable of providing, if a webpage associated with a search result is displayed on a display, the user with a list of recommended websites related to at least one of the keywords corresponding to the displayed webpage and search results.

The present disclosure provides an electronic device and search keyword processing method thereof that is capable of providing the user with a webpage including the search results retrieved under the keyword on the selected website if a website is selected from the recommended website list.

In accordance with an aspect of the present disclosure, an electronic device is provided. The electronic device includes: a display, a communication circuit, a processor operatively connected to the display and the communication circuit, and a memory operatively connected to the processor, wherein the memory is configured to store a web browser including a uniform resource locator (URL) address bar and at least one application program, wherein the memory is further configured to store instructions that, when executed by the processor, cause the electronic device be configured to: display a first webpage including a search box using the web browser, on the display, receive at least one search text through the search box and/or the URL address bar, transmit the at least one search text to a first external server associated with the first webpage via the communication circuit, receive a first search result associated with the search text from the first external server, display the first search result on the display, receive a user input for selecting a second webpage or an application program for using the search text, transmit data associated with the search text to a second external server associated with the second webpage or the application program via the communication circuit without further receiving the search text, receive a second search result associated with the search text from the second external server, and display the second search result on the display.

In accordance with another aspect of the present disclosure, a search keyword processing method of an electronic device includes: displaying a first webpage including a search box on a display using a web browser, receiving at least one search text through the search box and/or a URL address bar, transmitting the search text to a first external server associated with the first webpage via a communication circuit, receiving a first search result associated with the search text from the first external server, displaying the first search result on the display, receiving a user input for selecting a second webpage or an application program for using the search text, transmitting data associated with the search text to a second external server associated with the second webpage or the application program via the communication circuit without further receiving the search text, receiving a second search result associated with the search text from the second external server, and displaying the second search result on the display.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 6A and 6B are diagrams illustrating an example method for processing a search keyword according to various embodiments of the present disclosure.

DETAILED DESCRIPTION

Figure 1:
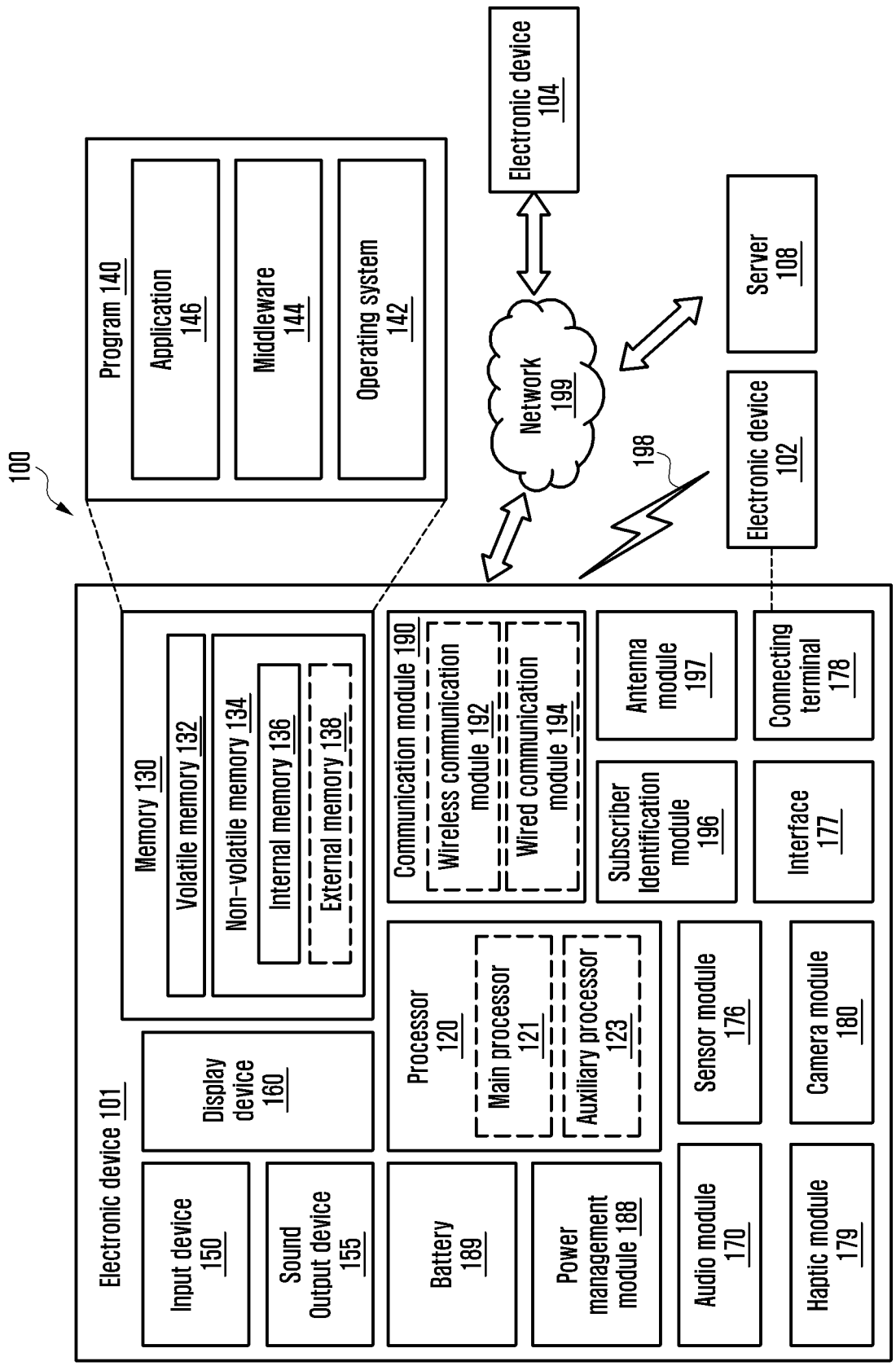
FIG. 1 is a block diagram illustrating an example configuration of an electronic device for processing a search keyword in a network environment according to various embodiments of the present disclosure.

FIG. 1 is a block diagram illustrating an example configuration of an electronic device 101 for processing a search keyword in a network environment 100 according to various embodiments of the present disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
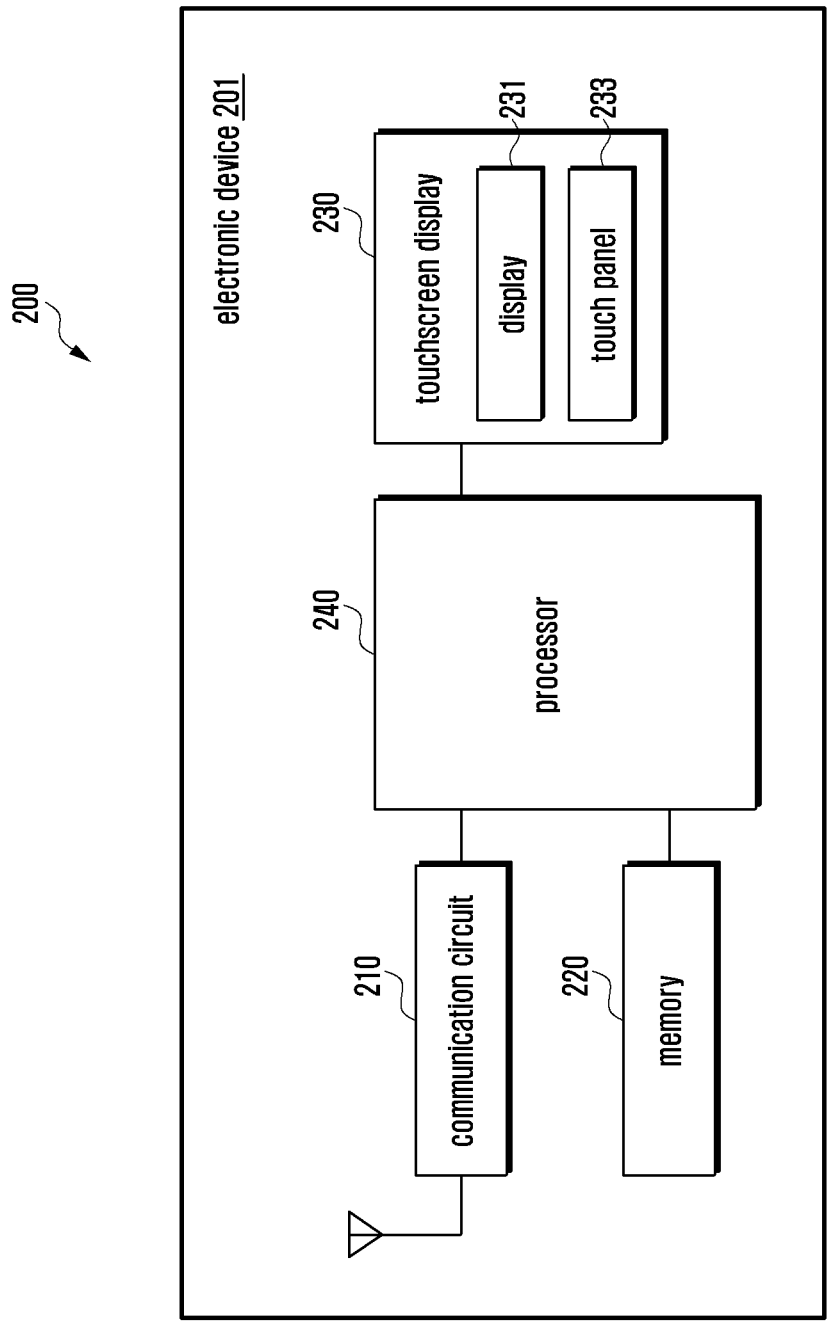
FIG. 2 is a block diagram illustrating an example configuration of an electronic device for processing a search keyword according to various embodiments of the present disclosure.

FIG. 2 is a block diagram 200 illustrating an example configuration of an electronic device 201 for processing a search keyword according to various embodiments of the present disclosure.

With reference to FIG. 2, the electronic device 201 (e.g., electronic device 101 of FIG. 1) may include a communication circuit 210 (e.g., communication module 190 of FIG. 1), a memory 220 (e.g., memory 130 of FIG. 1), a touch-screen display 230 (e.g., display device 160 of FIG. 1), and a processor 240 (e.g., including processing circuitry, e.g., processor 120 of FIG. 1).

According to various embodiments of the present disclosure, the communication circuit 210 (e.g., communication module 190 of FIG. 1) may establish a communication connection with an external electronic device (e.g., electronic devices 102 and 104 and server 106 of FIG. 1). For example, the communication circuit 210 may make it possible to communicate with the external electronic device via a wireless and/or wireline communication network. The communication circuit 210 may connect to the external device via a wireless or wireline interface (e.g., interface 177 of FIG. 1).

In an embodiment of the present disclosure, the communication circuit 210 may communicate data with the connected external electronic device under the control of the processor 240. For example, the data may include, for example, and without limitation, at least one of category information of at least one website, category information of at least one application program, category information of at least one search text (e.g., search keyword), a format of address information of at least one website, or the like.

According to various embodiments of the present disclosure, the memory 220 (e.g., memory 130 of FIG. 1) may be electrically connected to the processor 240.

In an embodiment of the present disclosure, the memory 220 may store at least one of the category information of the at least one website, the category information of the at least one application program, and the category information of the at least one search text, and the format of the address information of the at least one website.

According to various embodiments of the present disclosure, the touchscreen display 230 (e.g., display device 160 of FIG. 1) may be implemented as an integration of a display 231 and a touch panel 233. The display 231 may display various screens associated with the use of the electronic device. Examples of the display 231 may include, for example, and without limitation, a liquid crystal display (LCD), a light-emitting diode (LED) display, an organic LED (OLED) display, a microelectromechanical systems (MEMS) display, an electronic paper display, or the like. The display 231 may display various contents (e.g., text, image, video, icon, and symbol) to the user. The touch panel 233 may receive a touch, gesture, proximity, or hovering input made with an electronic pen or part of a human body.

In an embodiment of the present disclosure, the display 231 may display a first webpage including a search box in the web browser along with the ULR address bar of the web browser under the control of the processor 240. The display 231 may also display a recommendation list containing at least one website and/or application program associated with at least one of the first webpage and extracted search texts under the control of the processor 240. The display 231 may display at least one webpage or application program via at least one of an icon, a text and/or a symbol under the control of the processor 240.

If an input for selecting a website or an application program from the recommendation list is detected, the display 231 may display a second webpage including the search results corresponding to the search text retrieved via the selected website or application program under the control of the processor 240.

According to various embodiments of the present disclosure, the processor 240 (e.g., processor 120 of FIG. 1) may control overall operations of the electronic device 201 and signal flows among internal components of the electronic device 210, perform data processing, and control power supply from a battery (e.g., battery 189 of FIG. 1) to the internal components.

In an embodiment of the present disclosure, the processor 240 may display a first webpage including a search box in the web browser or a URL address box of the web browser on the display 231. If at least one search text is entered into the search box or the URL address box of the web browser, the processor may send the search text to a first external server associated with the first webpage via the communication circuit 210. The processor 240 may receive a first search result related to the search text from the first external server and display the first search result on the display 231.

In an embodiment of the present disclosure, the processor 240 may extract the search text from the first search result. In an embodiment of the present disclosure, the processor 240 may determine at least one website and/or at least one application program associated with at least one of the first webpage and the extracted search text and display the determination result as a recommendation list on the display 231. For example, the processor 240 may compare at least one of the category information of the first webpage and the category information of the extracted search text and the category information of at least one website. In an embodiment of the present disclosure, the processor 240 may compare at least one of the category information of the extracted webpage and the category information of the extracted search text and the category information of the at least one application program. The processor 240 may determine at least one website and/or application program with the same category information as at least one of the category information of the first webpage and the category information of the extracted search text and display the determination result as the recommendation list on the display 231.

In an embodiment of the present disclosure, if a website or an application program is selected from the recommendation list, the processor 240 may send the data related to extracted search text to a second external server associated with the selected website or application program. The processor 240 may receive a second search result associated with the extracted search text from the second external server and display the second search result on the display 231.

In an embodiment, an electronic device may include a display 231, a communication circuit 210, a processor 240 operatively connected to the display 231 and the communication circuit 210, and a memory 220 operatively connected to the processor 240, wherein the memory 220 is configured to store a web browser including a uniform resource locator (URL) address bar and at least one application program, wherein the memory 220 is further configured to store instructions that, when executed by the processor 240, cause the electronic device 201 to be configured to: display a first webpage including a search box, using the web browser on the display 231, receive at least one search text through the search box and/or the URL address bar, transmit the search text to a first external server associated with the first webpage via the communication circuit 210, receive a first search result associated with the search text from the first external server, display the first search result on the display 231, receive a user input for selecting a second webpage or an application program for using the search text, transmit data associated with the search text to a second external server associated with the second webpage or the application program via the communication circuit 210 without further receiving the search text, receive a second search result associated with the search text from the second external server, and display the second search result on the display 231.

In an embodiment, the first and second webpages may be associated with different search engines.

In an embodiment, the instructions, when executed by the processor 240, cause the electronic device 201 to provide at least one icon, text, and/or symbol associated with the second webpage or the application program on the display 231.

In an embodiment, the instructions, when executed by the processor 240, cause the electronic device 201 to display, after receiving the first search result, a text string in the URL address bar and extract at least part of the search text from the text string.

In an embodiment, the instructions, when executed by the processor 240, cause the electronic device 201 to analyze, after receiving the first search result, a hypertext markup language (html) of a webpage including the first search result and extract at least part of the search text from the analyzed html.

In an embodiment, the instructions, when executed by the processor 240, cause the electronic device 201 to decode information encoded based on an encoding processing scheme of a website corresponding to the first webpage and extract the decoded information from the text string presented in the URL address bar.

In an embodiment, the instructions, when executed by the processor 240, cause the electronic device to compare at least one of: category information of the first webpage and category information of the search text, with category information of at least one webpage stored in the memory 220 and/or an external electronic device and/or the at least one application program and determine at least one website and/or at least one application program with the category information similar to at least one of the category information of the first webpage and the category information of the search text among the at least one website and/or at least one application program stored in the memory 220 or the external electronic device.

In an embodiment, the instructions, when executed by the processor 240, cause the electronic device 201 to display the determined at least one website and/or the at least one application program on the display 231 in a form of a recommendation list.

In an embodiment, the instructions, when executed by the processor 240, cause the electronic device 201 to determine category information of the search text based on at least one of: a preference for the search text received from the external electronic device and a preference for a user of the electronic device 201.

In an embodiment, the instructions, when executed by the processor 240, cause the electronic device 201 to ascertain at least one of: a search frequency and an access frequency with at least one webpage and/or at least one application program and display a recommendation list containing the at least one webpage and/or the at least one application program arranged in descending order of the frequency based on the ascertained frequency on the display 231.

Figure 3:
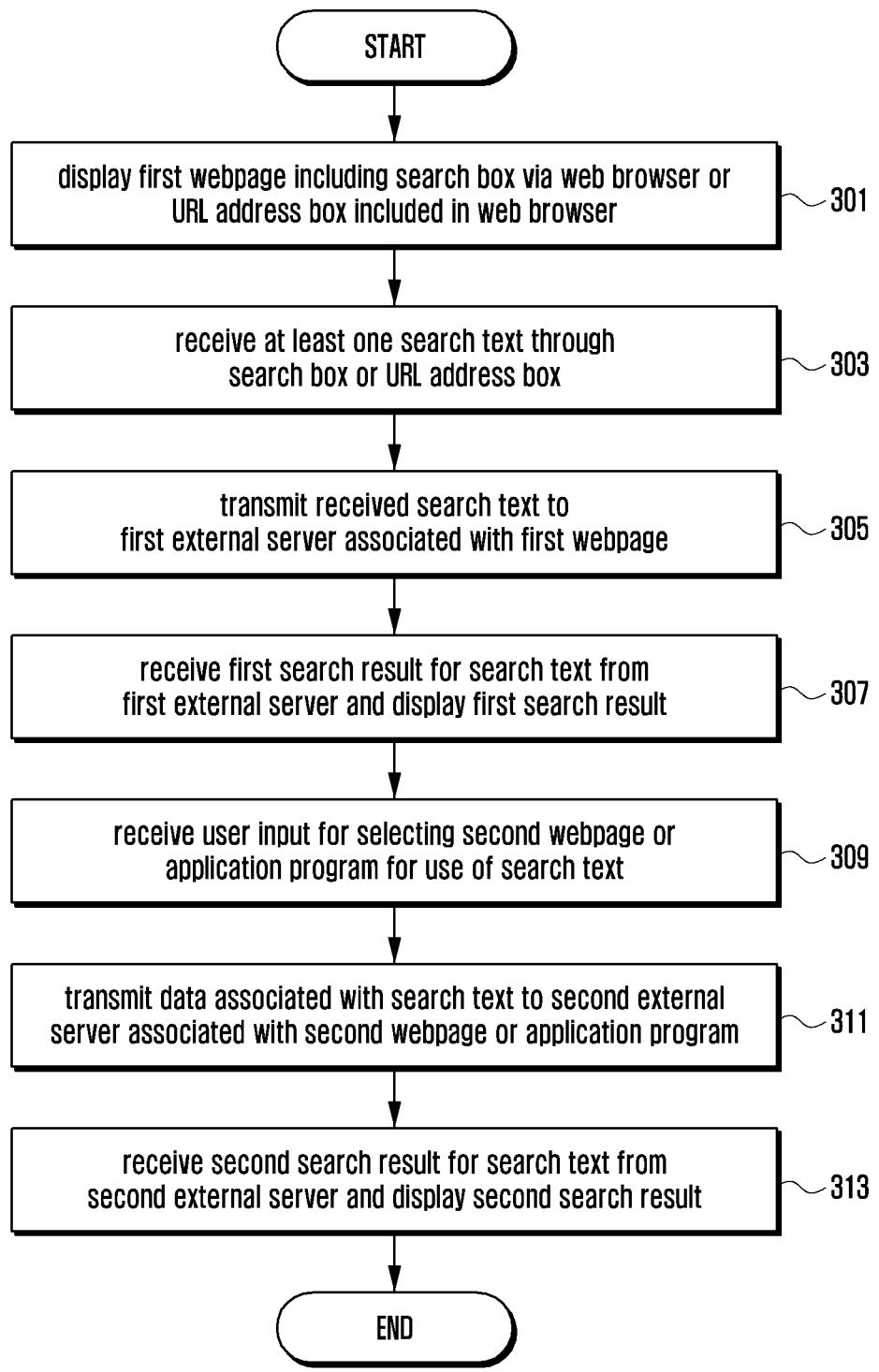
FIG. 3 is a flowchart illustrating an example search keyword processing method according to various embodiments of the present disclosure.

FIG. 3 is a flowchart 300 illustrating an example search keyword processing method according to various embodiments of the present disclosure.

With reference to FIG. 3, the processor (e.g., processor 240 of FIG. 2) may display a first webpage including a search box via a web browser and/or a URL address box included in the web browser on a display (e.g., display 231 of FIG. 2) at step 301.

In an embodiment, the processor may receive at least one search text through the search box or the URL address box of the web browser at step 303.

In an embodiment, the electronic device may transmit the search text to a first web server associated with the first webpage through a communication circuit (e.g., communication circuit 210 of FIG. 2) at step 305.

In an embodiment, the electronic device may receive a first search result associated with the search text from the first external server and display the first search result on the display at step 307.

In an embodiment, the processor may extract the search text associated with the first search result display on the display. For example, the processor may extract the search text for use in another webpage (e.g., second webpage) or at least one application program. For example, the at least one application program may be an application supporting a search function installed in the electronic device (e.g., electronic device 201 of FIG. 2).

In an embodiment, the processor may compare address information of the first webpage associated with the first search result and formats of address information of the first website corresponding to the first webpage. Through this comparison, the processor may ascertain a parameter indicating the search text in the format of the address information of the first website. If it is determined that the parameter indicating the search text in the format contains information, the processor may extract the information as the search text for use in another webpage (e.g., second webpage) or an application program.

In an embodiment, the processor may compare at least one of information input in an input field (e.g., search box) included in the first webpage and parameter information of the first webpage with address information of the first webpage. As a result of the comparison, if it is determined that the address information of the first webpage includes at least one of the information input in the input field and the parameter information of the first webpage, the processor may extract the information as the search text for use in another webpage (e.g., second webpage) or application program.

In an embodiment, the processor may compare the information input in the input field (e.g., search box) included in the first webpage with the parameter information of the first webpage. If the input information includes the parameter information of the first webpage, the processor may extract the information as the search text for use in another webpage (e.g., second webpage) or application program.

In an embodiment, the processor may compare information input by means of an input device (e.g., keyboard and microphone) before displaying the first webpage with address information of the first webpage displayed as the first webpage is loaded. If the information input by means of the input device includes the address information of the first webpage, the processor may extract the information as the search text for use in another webpage (e.g., second webpage) or application program.

In an embodiment, the processor may decode the information encoded in an encoding processing scheme for a first website corresponding to the first webpage and compare the decoded information with the parameter information of the first website. Through the comparison, if it is determined that the decoded information includes the parameter information of the first website, the processor may extract the decoded information as the search text for use in another webpage (e.g., second webpage) or application program.

In an embodiment, the electronic device may receive a user input, at step 309, for selecting a second webpage or an application program for use of the extracted search text therewith.

In an embodiment, the electronic device may store category information of the at least one website and at least one search text in the memory (e.g., memory 220 of FIG. 2). Alternatively, the electronic device may receive the category information of the at least one website and the at least one search text from the external electronic device (e.g., electronic devices 102 and 104 and server 106 of FIG. 1) via the communication circuit. For example, the category information may include search, news, shopping, entertainment, and dictionary information.

In an embodiment, the processor may compare at least one of the category information of the first webpage and the category information of the extracted search text with the category information of the at least one website. Alternatively, the processor may compare at least one of the category information of the first webpage and the category information of the extracted search text with the category information of the at least one application program. For example, the at least one website may be a website stored in the memory or an external electronic device.

In an embodiment, through the comparison, it is possible to determine at least one website and/or application program with the category information identical with or similar to at least one of the category information of the first webpage and the category information of the extracted search text among the at least one website and/or application program stored in the memory or the external electronic device.

In an embodiment, the electronic device may display a recommendation list containing the determined at least one website and/or application program on the display.

In an embodiment, the electronic device may receive a user input for selecting a website or an application program from the recommendation list.

In an embodiment, the electronic device may display the recommendation list containing the at least one website and/or application program arranged in a predetermined order. For example, the processor may ascertain a user's search frequency or access frequency for at least one website. The electronic device may display the websites in descending of search or access frequency based on the ascertained result. Alternatively, the processor may ascertain the user's execution frequency of at least one application program. The electronic device may display the application programs in descending order of the execution frequency based on the ascertained result.

In an embodiment, the electronic device may display preferentially at least one website and/or application program of a content provider having an interest-sharing relationship such as revenue share. For example, among web sites A, B, and C having "shopping" category information, if the site A has a contract for an interest-sharing relationship for revenue share, the electronic device may display a recommendation list in which the website C ranks higher than the websites A and B.

In an embodiment, the electronic device may transmit, at step 311, the data associated with the search text to a second external server associated with the second webpage or the application program.

In an embodiment, as the recommendation list containing at least one webpage associated with at least one of the first webpage and the search text is displayed, the user may reuse the search text corresponding to the search result of the first website in another website selected from the recommendation list with a user's additional input of an address of another website or the search text.

In an embodiment, the electronic device may receive a second search result associated with the search text from the second external server and display the second search result on the display at step 313.

Figure 4A:
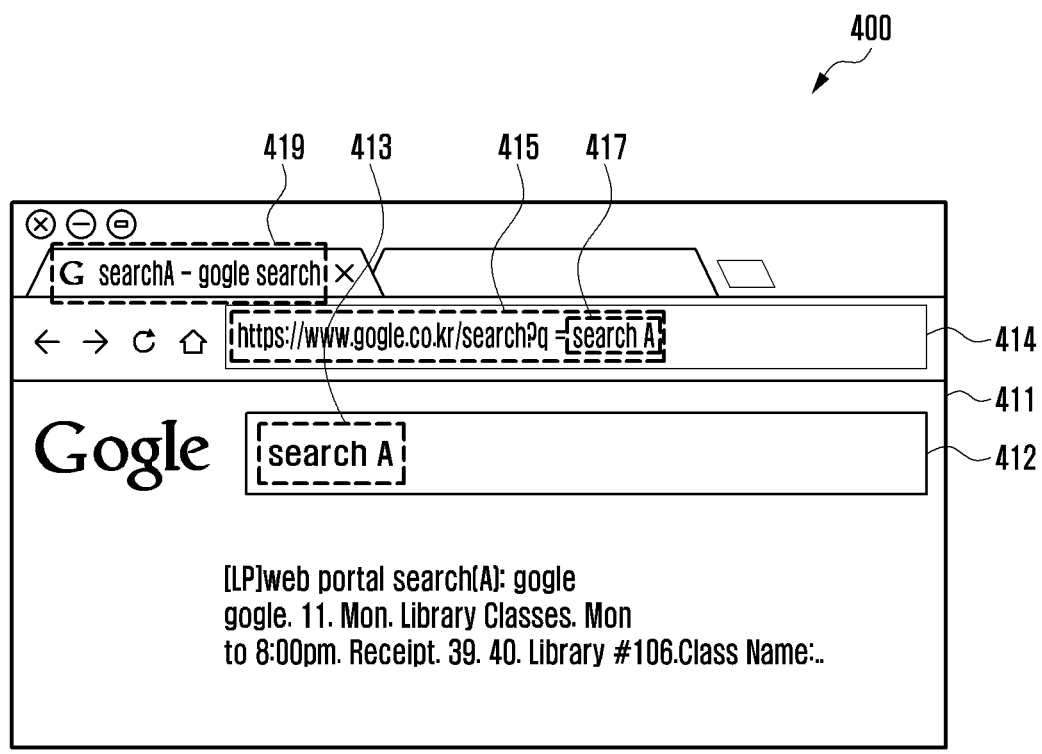
FIGS. 4A, 4B and 4C are diagrams illustrating an example method for extracting a search keyword from a webpage according to various embodiments of the present disclosure.
Figure 4B:
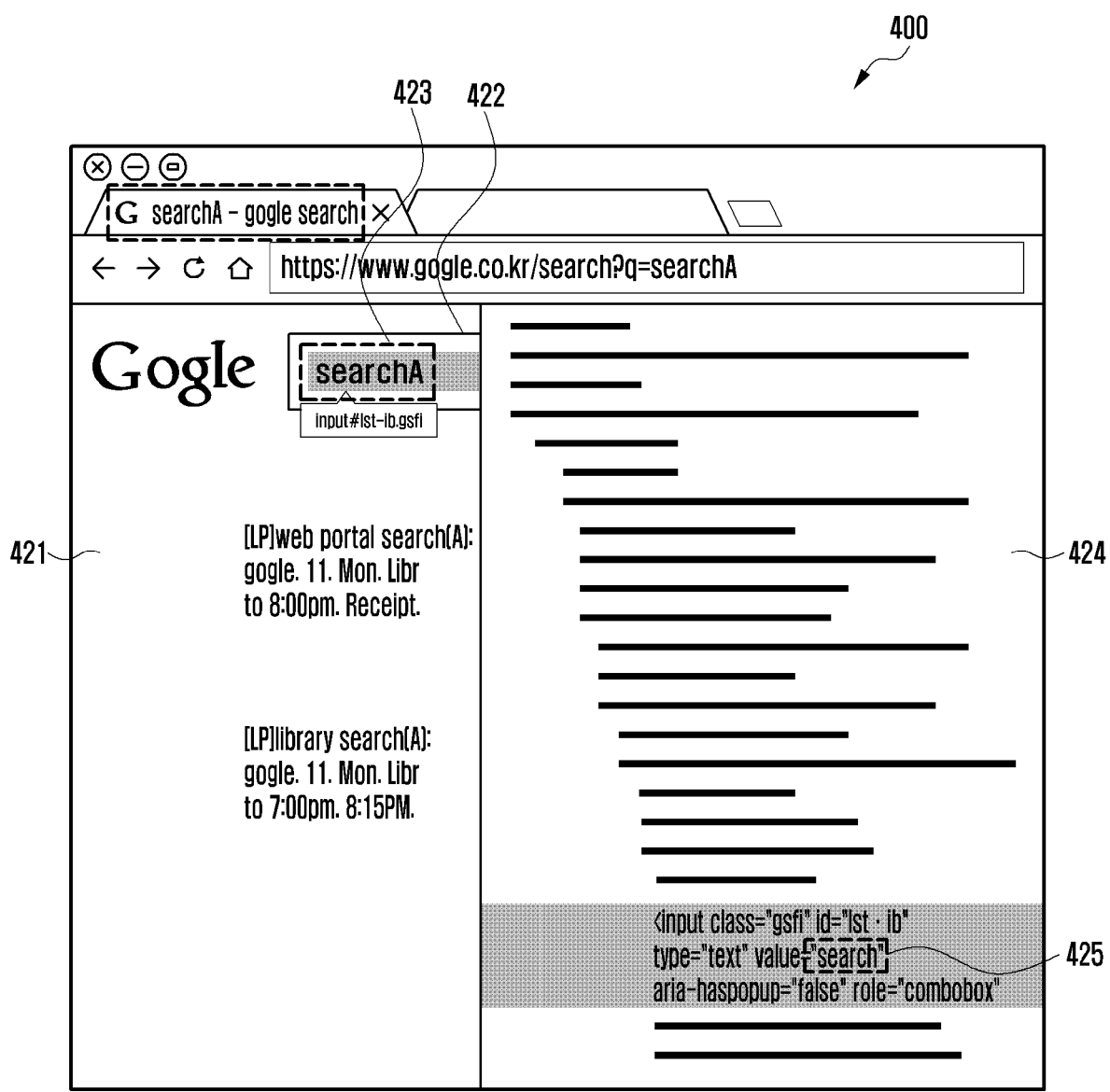
Figure 4C:
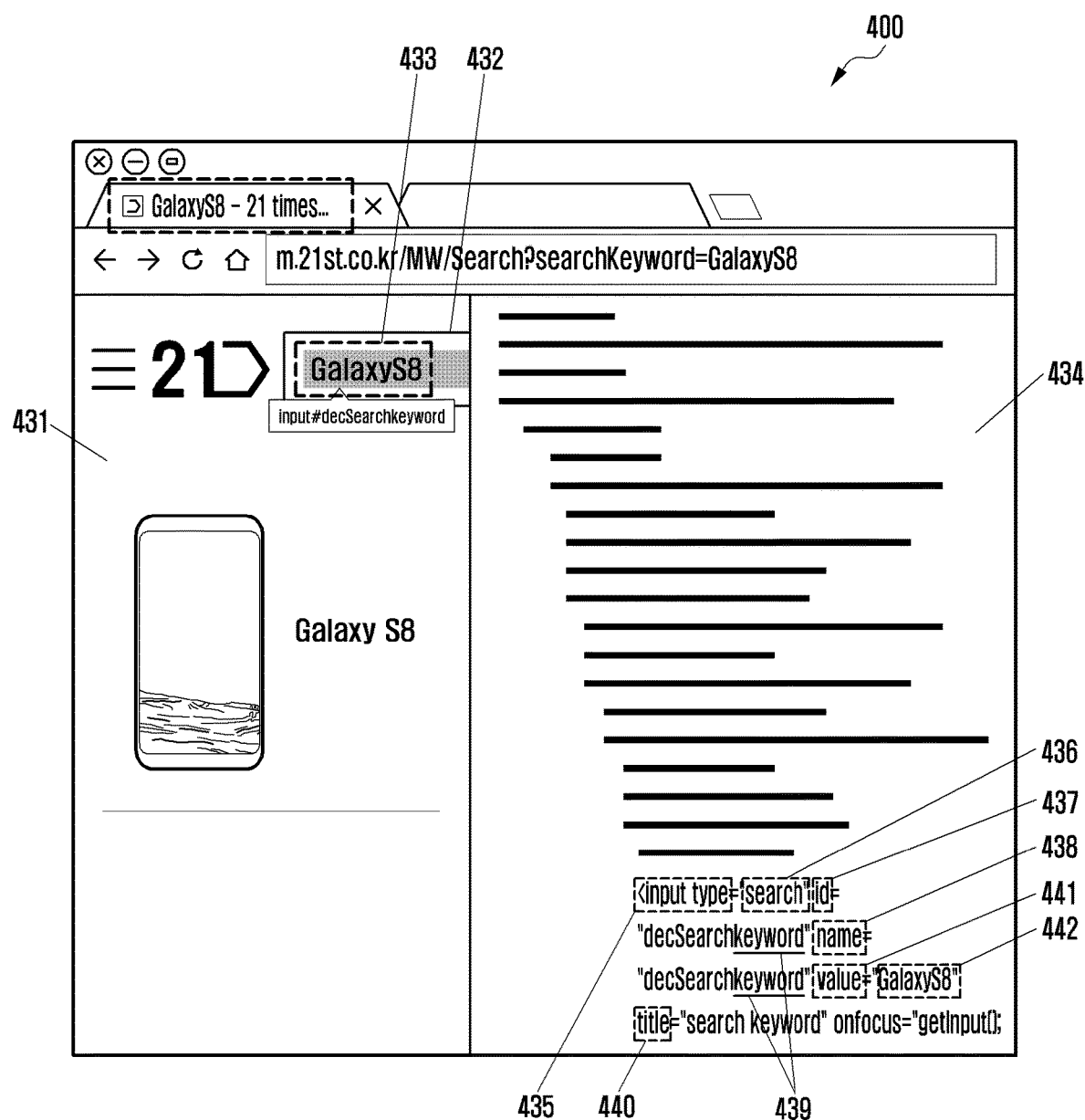

FIGS. 4A, 4B and 4C are diagrams illustrating an example method 400 for extracting a search keyword from a webpage according to various embodiments of the present disclosure.

In an embodiment, the processor (e.g., processor 240) may cause the electronic device to display a webpage on the display (e.g., display 231 of FIG. 2). The displayed webpage may include at least one input field (e.g., search box). For example, the input field may be a field for receiving information (e.g., text and number) input by means of an input device (e.g., input device 150 of FIG. 1).

In an embodiment, the processor may determine whether any information is input through the at least one input field. If any information is entered into the input field, the processor may compare the entered information with the address information (e.g., uniform resource identifier (URI)) of the webpage displayed on the display. This comparison operation may be an operation for determining whether the address information of the webpage includes the information entered into the at least one input field, by way of example. If the address information of the webpage includes the information entered into the at least one field, the processor may extract the information entered into the at least one input field as a search text.

In an embodiment, if any page loading request (e.g., selection of a button of "send", "confirm", or "search") is not made in the state where the information is entered into the at least one input field, the processor may not perform the operation for extracting the search text.

In reference to FIG. 4A, the processor may cause the electronic device to display a webpage 411 on the display as denoted by reference number <410>. The processor may extract a search text from the displayed webpage 411. For example, the processor may determine whether the search keyword "search A" 413 entered into the at least one input field 412 of the webpage 411 is included in the address information 415 of the webpage 411 that is entered into the URL address box 414 (e.g., https://www.gogle.co.kr/search?q=searchA). If the search keyword "search A" 413 entered into the at least one input field 412 is included in the address information of the webpage, the processor may extract the search keyword "search A" 413 entered into the at least one input field 412 as a search text.

In an embodiment, the processor may compare a source code of the webpage 411 displayed on the display, e.g., at least part of information included in a <title> element 419 in the html document, with the address information 415 (e.g., URI) of the webpage 411 entered into the URL address box 414. Through this comparison, the processor may determine whether the address information of the webpage includes at least part of the information included in the <title> element 419. If the address information of the webpage includes at least part of the information included in the <title> element 419, the processor may extract the at least part of the information included in the <title> element 419 as the search text.

With reference to FIG. 4A, the electronic device may display a webpage 411 on the display as denoted by reference number <410>. The processor may analyze the <title> element 419 in the html document of the webpage 411. For example, the <title> element 419 of the webpage 411 may be "searchA—Gogle search". The title of the webpage 411 may be marked in the form of "<title>searchA—Gogle search</title> in a <head> element of the html document. The processor may determine whether at least part of the "searchA—Gogle search" is included in the address information 415 of the webpage 411, e.g., "https://www.gogle-.co.kr/search?q=searchA". Because "searchA" as part of the information contained in the <title> element 419 of the webpage 411 is included in the address information 415 of the webpage 411, the processor may extract "searchA" included in the <title> element as the search text.

In an embodiment, if any information is entered into the at least one input field 412 (e.g., search box) of the webpage 411, the processor may determine whether the entered information is included in the html document of the webpage 411. For example, the processor may determine whether at least part of the information entered into the at least one input field 412 is included in a parameter "value" of the <input> element in the html document of the webpage 411. For example, the processor may ascertain the information included in the parameter "value" of the <input> element in the html document of the webpage 411. The processor may determine whether the information entered into the at least one input field 412 is included in the parameter "value" of the <input> element in the html document of the webpage 411. If so, the processor may extract the information included in the parameter "value" as the search text.

With reference to FIG. 4B, the electronic device may display a webpage 421 on the display as denoted by reference number <420>. The processor may extract a search text from the displayed webpage 421. For example, the processor may determine whether "search A" 423 entered into the at least one input field 422 (e.g., search box) of the webpage 421 is included in the html document 424 of the webpage 421. For example, if the "search A" 425 included in the parameter "value" of the <input> element within the html document 424 and the information (e.g., "search A" 423) entered into the at least one input field 422 are same, the processor may extract the "search A" 425 entered into the at least input field 422 as the search text.

In an embodiment, if the information entered into the at least one input field of the webpage displayed on the display is included in the address information (e.g., URI) of the webpage and a parameter <title> or <value> inside the <input> element in the html document of the webpage, the processor may extract the information entered into the at least one input field as the search text.

In an embodiment, the processor may analyze a parameter defined to indicate a search in the html document of the webpage displayed on the display. For example, the parameter defined to indicate a search may include at least one of "value", "id", "time", and "title" included in the <input> element of the html document. However, the parameter is not limited to the information enumerated above.

In an embodiment, the processor may determine whether the defined parameter includes search-related information. The search-related information may include "search", "keyword", or "query". For example, if the information entered into the at least one input field is included in at least one of the parameters included in the <input> element of the html document, the processor may extract the information entered into the at least one input field as the search text.

With reference to FIG. 4C, the electronic device may display a webpage 431 on the display as denoted by reference number <430>. The processor may extract a search text from the displayed webpage 431. For example, the processor may determine whether a parameter defined for indicating a search (e.g., "input type", "value", "id", "name", and "title") includes at least part of search-related information (e.g., "search", "keyword", and "query"). In the <input> element of the html document 434 of the webpage 431, a parameter "input type" 435 may include "search" 436, and parameters "id" 437 and "name" 438 may include "keyword" 439. The processor may determine whether "Galaxy S8" 433 entered into at least one input field 432 of the webpage 431 is included in a parameter defined to indicate a search in the html document 434 of the webpage 431 (e.g., at least one of "input type" 435, "id" 437, "name" 438, "value" 441, and "title" 440 contained in the <input> element of the html document). Because the "Galaxy S8" 433 entered into the at least one input field 432 is included in the defined parameter, e.g., value 411="GalaxyS8" 442, the processor may extract "GalaxyS8" as a search text.

In an embodiment, the processor may compare the address information of the webpage displayed on the display and the formats of the address information of the at least one searchable webpage stored in the memory (e.g., memory 220 of FIG. 2) of the electronic device (e.g., electronic device 201 of FIG. 2) or an external electronic device (e.g., electronic devices 102 and 104 and server 106 of FIG. 1) to determine whether the parameter indicative of a search text contains information (e.g., text).

For example, in the case that a search is performed with website A, the address information of the website A may be formatted as shown in Table 1.

TABLE 1

Address information format of website A https://www.A.com/search?source=android-browser&q={searchTerms}

In an embodiment, the format of the address information of the website A may be stored in the memory of the electronic device or received from an external electronic device. A parameter "{searchTerms}" included in the address information that contains a search text may be a variable element.

In an embodiment, if an input for executing a search function with the search text in the website A is detected, the processor may include the search text in the "{searchTerms}" as a variable element in the format of the address information of the website A and execute the search function with the search text using the corresponding website.

In an embodiment, a "q=" element appearing before "{searchTerms}" may refer to a parameter indicative of the search text. The parameter indicative of the search text may differ among websites. For example, the parameters included in the address information of a website may be separated by a mark "?" and then by a mark "&".

In an embodiment, the processor may compare the formats of the address information (e.g., URI) of the webpage A displayed on the display and the address information of the website A. Through this comparison, if there is the parameter "q=" indicative of the search text in the address information of the website A, the processor may extract the information (e.g., information ending with the mark "&") as a search text. For example, if the address information of the webpage displayed on the display is "https://www.A.com/search?source=android-browser&q=searchA", the processor may extract "searchA" as the information corresponding to "q=" as the parameter indicative of the search text as the search text.

In an embodiment, the processor may compare the format of the address information (e.g., URI) of the webpage of the web site A that is displayed on the display with the format of the address information of the website A regardless of the order of the parameters arranged in the address information of the webpage. For example, in the case of the address information "https://www.A.com/search?q=searchA&source=android-browser" that is different in the order of enumerating the parameters from the format of the address information of the website A, the processor may check the parameter "q=" indicative of the search text and extract "searchA" corresponding to "q=" as the search text.

In an embodiment, in the case of comparing the formats of the address information (e.g., URI) of a webpage of a website B that is displayed on the display and the address information of the website B, the processor may compare a main domain and a sub-domain. For example, although the sub-domains differ from each other, if they share the main domain, the processor may determine that the webpages are provided by the same service provider. In this case, the processor may check the parameter indicative of the search text defined for the website B for extracting the search text for use in another webpage or application program.

In an embodiment, in the case of comparing the address information of the website B that includes category information of "search" with the address information of the website B that includes category information of "shopping", the two addresses may share the main domain of "B.com" but differ between sub-domains of "search.B.com" and "shopping.B.com". Because the webpages different in category information share the same main domain of the website B, the processor may determine that the webpages are provided by the same content provider as the owner of "B.com". The processor may extract the parameter indicative of the search text defined for the website B, e.g., information of "searchA" included in the "query=", as the search text.

TABLE 2

| Website | Category | Per-category address information format of website B |
|---|---|---|
| Website B | Search | https://search.B.com/search.B?query=searchA |
| Website B | Shopping | http://shopping.B.com/search/all.nhn?query=searchA |

In an embodiment, it may be possible to compare the format of the address information of website A as shown in Table 1 with the address information (e.g., "http://search.A.com/search?q=searchB") of a webpage of the website A. For example, the address information of a webpage, e.g., following a protocol scheme (e.g., http:// and https://) of the URI and before a delimiter "/", may share the main domain of "A.com" but have a different sub-domain of "shopping.A.com". Because of sharing the main domain of the website A, the processor may determine that the webpages belong to the same content provider A. The processor may extract the parameter name indicating the search text defined for the website A, e.g., information "searchB" included in the "q=" as the search text.

In an embodiment, if the information entered by an input device (e.g., keyboard and microphone) before a webpage displayed on the display is loaded is identical with the parameter "value" of the address (URI) of the displayed webpage, the processor may determine the key value matching the parameter "value" as the parameter indicative of the search text.

For example, if the processor detects an input of, for example, "Samsung" that is made onto the accessed website by means of an input device, it may store "Samsung". Afterward, if a webpage is loaded, the processor may determine whether the address information (e.g., URI) includes the corresponding information. In this case, the address information (e.g., URI) of the newly loaded webpage, e.g., webpage B, may be "http://search.B.com/search.B?query=Samsung". In the case where the address information of the webpage B includes "Samsung", the processor may extract "Samsung" as the search text. In this case, the processor may extract the search text without storing the format of the address information of the aforementioned website in the memory or receiving it from an external electronic device.

In an embodiment, after extracting "Samsung" as the search text, the processor may check the parameter corresponding to the search text in the address information (e.g., URI) of the website B. For example, because the parameter "query=" contains "Samsung", the processor may determine "query" as the parameter indicative of the search text. If a format of the address information of the website B is not defined, the processor may store the new address of "http://search.B.com/search.B?query={searchTerms})" as the format of the address information of the website B in the memory or an external electronic device. By storing a format of the address information of an undefined website in the memory or the external electronic device, it becomes possible to extract the search text quickly and precisely.

In an embodiment, the processor may perform an update (addition, deletion, or modification) of a list of formats of the at least one address information stored in the memory or the external electronic device in real time. For example, if a search text is entered in a webpage, the processor may include the search text in the corresponding parameter in the format of the address information of the website corresponding to the webpage stored in the external electronic device. The processor may load the webpage in response to a webpage access request. Here, if an abnormal response (e.g., "404 NOT FOUND") is received in response to the access request for the webpage, the processor may perform an update operation to delete the format of the corresponding address information.

In an embodiment, the address information, e.g., URI, comparison may be made based on an encoding processing scheme for a website. For example, if "GalaxyS8" is entered in a webpage of a website C categorized with "shopping" category information, the processor may convert the webpage, e.g., encode the information on the parameter "searchKeyword", to a UTF8 format as shown in Table 3 and store the conversion result in the memory or the external electronic device.

For example, "%25EA%25B0%25A4%25EB%259F%25AD%25EC%258B%259CS8" of the address information of the webpage in the UTF8 format results from encoding the search text "GalaxyS8". If the address information (e.g., URI) includes the information that resulted from encoding "GalaxyS8", the processor may decode the encoded information to recover the original information. The processor may compare the recovered information with the parameter defined to indicate a search in the html document of the website to extract the search text.

TABLE 3

| Address information of webpage in UTF8 format |
|---|
| http://m.C.co.kr/MW/Search/searchProduct.tmall?searchKeyword=%25EA%25B0%25A4%25EB%259F%25AD%25EC%258B%259CS8 |

Figure 5:
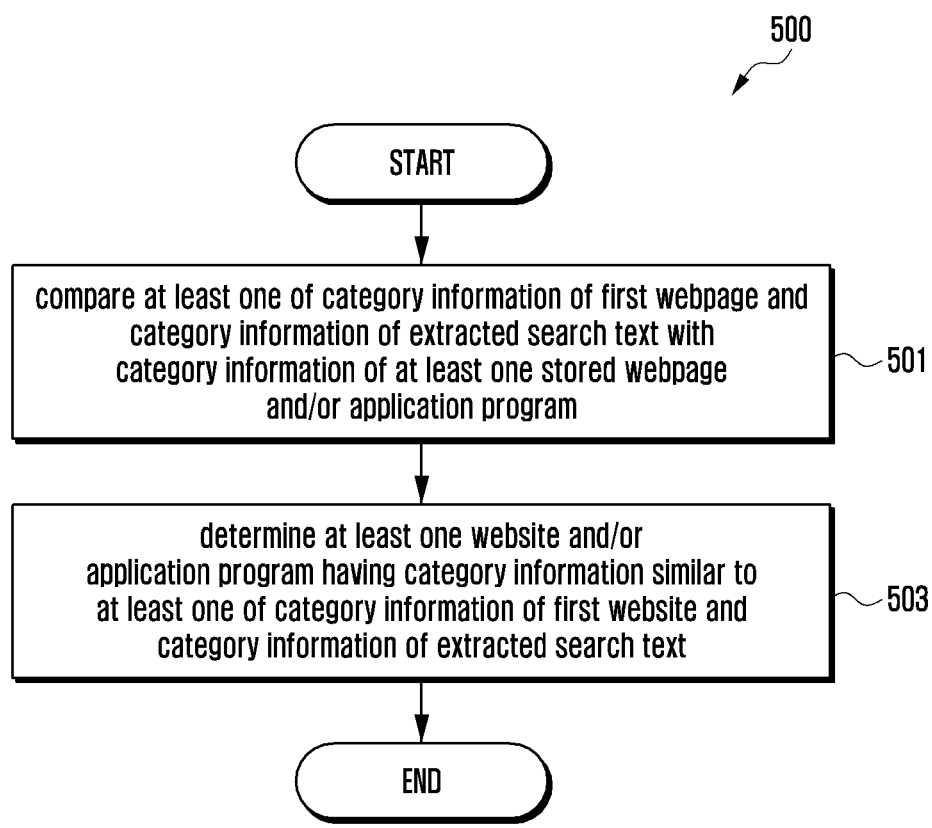
FIG. 5 is a flowchart illustrating an example method for selecting at least one website and/or at least one application program from a recommendation list according to various embodiments of the present disclosure.

FIG. 5 is a flowchart 500 illustrating an example method for selecting at least one website and/or at least one application program from a recommendation list according to various embodiments of the present disclosure.

With reference to FIG. 5, the processor (e.g., processor 240 of FIG. 2) may compare at least one of category information of a first webpage and category information of an extracted search text with category information of stored at least one webpage and/or application program at step 501.

In an embodiment, the processor may categorize at least one website. For example, the at least one website may be categorized into a category such as "search", "news", "shopping", "entertainment", and "dictionary". The processor may compare the webpage displayed on the display with the at least one categorized website to determine the category of the website displayed on the display.

In an embodiment, the processor may categorize a least one search text. For example, the processor may categorize the at least one search text into a category such as "search", "news", "shopping", "entertainment", and "dictionary". The processor may compare the extracted search text with the at least one categorized search text to determine the category of the extracted search text.

In an embodiment, the processor may determine, at step 503, at least one website and/or application program having the same or similar category information as at least one of the category information of the first website and the category information of the extracted search text that are determined through the above-comparison.

For example, the if the category information of the webpage displayed on the display matches "search", the processor may display a recommendation list containing at least one website and/or application program with the category information matching "search". Alternatively, if the category information of the extracted search text matches "shopping", the processor may display a recommendation list containing at least one website and/or application program with the category information matching "shopping".

In an embodiment, if the webpage displayed on the display and the extracted search text is not categorized, the processor may display a recommendation list containing at least one website and/or application program categorized with category information set to a default value. For example, if "searchC", even though it has the category information matching "shopping", is not categorized, the processor may display a recommendation list containing at least one website and/or application program with the category information matching "search" as a default value.

In an embodiment, the category information of the extracted search text may be determined based on at least one of a preference for the extracted search text received from an external electronic device and a preference for the user of the electronic device. For example, the preference for the extracted search text received from the external electronic device may include big data information (e.g., interest of users belonging to a specific community). The preference for the user of the electronic device may include a user's propensity (e.g., user's field of interest).

For example, if the processor detects a search request for "Nike" entered in a website with the category information matching "search", it may display webpages including the search results for "Nike". The processor may determine the category information of the extracted search text "Nike" as "shopping", by way of example, based on at least one of big data information and a user's propensity. Although the website displayed on the display has the category information matching "search", the processor may display a recommendation list containing at least one website and/or application program with the same category information as the category information, e.g., "shopping", of the search text.

Figure 6B:
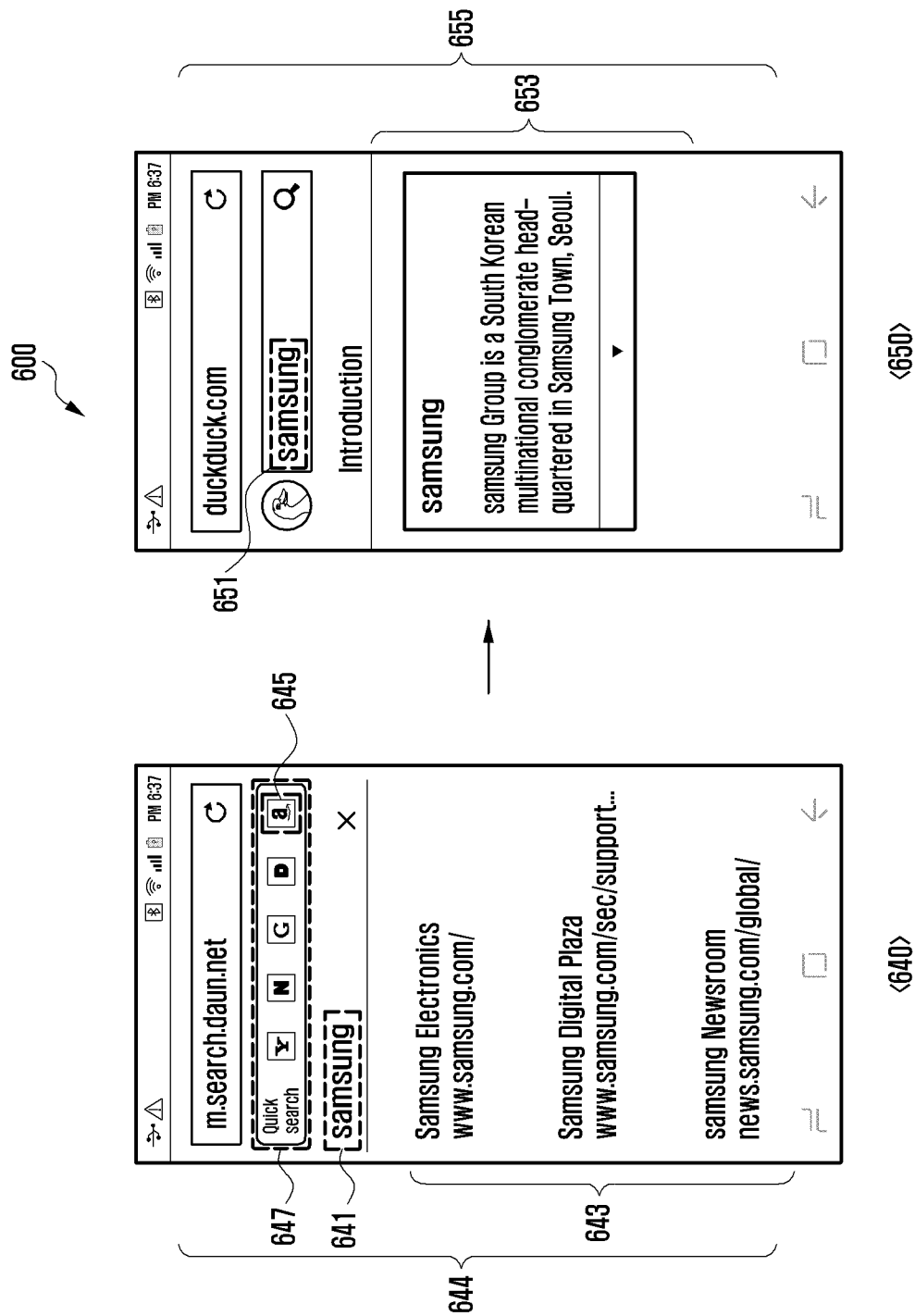

FIGS. 6A and 6B are diagrams 600 illustrating an example method for processing a search keyword according to various embodiments of the present disclosure.

With reference to FIG. 6A, the processor (e.g., processor 240 of FIG. 2) may display a webpage 615 including a search result 613 for the search text "Samsung" 611 as denoted by reference number <610>. In the course of displaying the webpage 615, the processor may detect a predetermined input. Examples of the predetermined input may include a touch gesture made on a touchscreen (e.g., touchscreen display 230 of FIG. 2) for displaying a recommendation list 621. If the predetermined input is detected, the processor may extract a search text from the displayed webpage 615. For example, the predetermined input may be made for selecting a URL address box of the web browser on the search result screen. However, the predetermined input is not limited thereto.

In an embodiment of the present disclosure, the processor may extract the search text from the webpage 615 as described with reference to FIGS. 4A, 4B and 4C and display the recommendation list 621 including at least one other webpage and/or application program for using the extracted search text as denoted by reference number <620>.

If a website or an application program is selected 623 from the recommendation list 621, the processor may display a second webpage 635 including a search result 633 of the selected website for the search text 631 as denoted by reference number <630>.

With reference to FIG. 6B, the processor may display a webpage 644 including a search result 643 for the search text "samsung" 641 as denoted by reference number <640>. The webpage 644 may include a recommendation list 647. For example, the processor may load the webpage 644 about "samsung" 641 in response to the search request for the search text "samsung" 641 and extract the search text from the webpage 644. The processor may display the recommendation list 647 including at least one webpage and/or application program 645 for using the extracted search text along with the search result 643. If a website or an application program is selected from the recommendation list 647, the processor may display a second webpage 655 including a search result 653 for the search text 651 searched using the selected website or application program, as denoted by reference number <650>.

In an embodiment, a search keyword processing method may include displaying a first webpage including a search box on a display (e.g., display 231 of FIG. 2) using a web browser, receiving at least one search text through the search box or the URL address bar, transmitting the search text to a first external server associated with the first webpage via a communication circuit (e.g., communication circuit 210 of FIG. 2), receiving a first search result associated with the search text from the first external server, displaying the first search result on the display, receiving a user input for selecting a second webpage and/or an application program for using the search text, transmitting data associated with the search text to a second external server associated with the second webpage and/or the application program via the communication circuit without further receiving the search text, receiving a second search result associated with the search text from the second external server, and displaying the second search result on the display.

In an embodiment, the first and second webpages are associated with different search engines from each other.

In an embodiment, the search keyword processing method includes displaying, after receiving the first search result, at least one icon, text, and/or symbol representing the second webpage or the application program on the display.

In an embodiment, the search keyword processing method includes displaying, after receiving the first search result, a text string in the URL address bar and extracting at least part of the search text from the text string.

In an embodiment, the search keyword processing method includes analyzing, after receiving the first search result, a hypertext markup language (html) of a webpage including the first search result and extracting at least part of the search text from the analyzed html.

In an embodiment, the search keyword processing method further includes decoding, after receiving the first search result, information encoded based on an encoding processing scheme of a website corresponding to the first webpage and extracting the decoded information from the text string presented in the URL address bar.

In an embodiment, the search keyword processing method further includes comparing, after receiving the first search result, at least one of category information of the first webpage and category information of the search text with category information of at least one webpage stored in the memory or an external electronic device or the at least one application program and determining at least one website and/or at least one application program with the category information similar to at least one of the category information of the first webpage and the category information of the search text among the at least one website or at least one application program stored in the memory or the external electronic device.

In an embodiment, the search keyword processing method further includes displaying a recommendation list containing the determined at least one website and/or the at least one application program on the display.

In an embodiment, the search keyword processing method further includes determining category information of the search text based on at least one of a preference for the search text received from the external electronic device and a preference for a user of the electronic device (e.g., electronic device 201 of FIG. 2).

In an embodiment, the search keyword processing method further includes arranging the at least one webpage and/or at least one application program in a predetermined manner and displaying the arranged webpage or application program.

In an embodiment, the search keyword processing method further includes ascertaining at least one of a search frequency and an access frequency of searches and accesses performed using the at least one webpage and/or at least one application program and displaying a recommendation list containing the at least one webpage or the at least one application program arranged in descending order of the frequency based on the ascertained frequency.

As described above, the electronic device and search keyword processing method of the present disclosure is advantageous in terms of providing a user with a list of websites related to at least one of a webpage displayed on a display and an extracted keyword. Also, the electronic device and search keyword processing method of the present disclosure is advantageous in terms of providing the user with the search results for the keyword with a high accuracy. Also, the electronic device and search keyword processing method of the present disclosure is advantageous in terms of making it possible for a user to search different websites at one attempt for information under the same keyword using a recommended website list with no repetitive website address and keyword inputs. Also, the electronic device and search keyword processing method of the present disclosure is advantageous in terms of improving a user's satisfaction by reducing the inconvenience of entering the same keyword on multiple websites and by retrieving search results quickly and efficiently.

The electronic device according to various embodiments may be one of various types of electronic devices. The electronic devices may include, for example, and without limitation, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, firmware, or any combinations thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been illustrated and described with reference to various example embodiments thereof, it will be understood by one skilled in the art that the various example embodiments are intended to be illustrative, not limiting. Thus, it will be understood that various modifications, alternatives and substitutions may be possible and fall within the spirit and scope of the disclosure as defined, for example, in the appended claims and their equivalents.

What is claimed is:

1. An electronic device, comprising:
   a display;
   a communication circuit;
   a processor operatively connected to the display and the communication circuit; and
   a memory operatively connected to the processor, wherein the memory is configured to store a web browser including a uniform resource locator (URL) address bar,
   wherein the memory is further configured to store instructions that, when executed by the processor, are configured to cause the electronic device to:
   display a first webpage associated with a first website including a search box, using the web browser, on the display;
   display, in response to receiving a first search text, the received first search text in the search box of the first webpage;
   transmit, via the communication circuit, the first search text to a first external server associated with the first webpage in response to detecting a first input for performing a search using the first search text;
   receive a first search result associated with the first search text from the first external server;
   compare category information of the first webpage and category information of the first search text with category information of at least one webpage to be stored in the memory and an external electronic device;
   determine a plurality of websites having category information similar to the category information of the first webpage and the category information of the first search text among the at least one website stored in the memory and the external electronic device;
   display the first search result associated with the first search text and a recommendation list including the determined plurality of websites, wherein the determined plurality of websites is search engines different from the first webpage;
   receive a second input selecting a second website of the plurality of websites included in the recommendation list to perform another search using the first search text, without further receiving a second search text;
   transmit the first search text to a second external server associated with the selected second website via the communication circuit, in response to receiving the second input;
   receive a second search result associated with the first search text from the second external server; and
   display a second webpage including the second search result associated with the first search text on the display,
   wherein the recommendation list further includes a plurality of websites having category information identical to the category information of the first webpage and the category information of the first search text among the at least one web site to be stored in the memory and the external electronic device.

2. The electronic device of claim 1, wherein the instructions, when executed by the processor, cause the electronic device to provide at least one icon, text, and/or symbol representing the plurality of websites on the display.

3. The electronic device of claim 1, wherein the instructions, when executed by the processor, cause the electronic device to:
   display, after receiving the first search result, a text string in the URL address bar; and
   extract at least part of the first search text from the text string.

4. The electronic device of claim 1, wherein the instructions, when executed by the processor, cause the electronic device to:
   analyze, after receiving the first search result, a hypertext markup language (html) of a webpage including the first search result; and
   extract at least part of the first search text from the analyzed html.

5. The electronic device of claim 1, wherein the instructions, when executed by the processor, cause the electronic device to decode information encoded based on an encoding processing scheme of the first website corresponding to the first webpage and to extract the decoded information from the text string presented in the URL address bar.

6. The electronic device of claim 1, wherein the recommendation list includes the determined plurality of websites with the category information similar to at least one of the category information of the first webpage and the category information of the first search text on the display.

7. The electronic device of claim 1, wherein the instructions, when executed by the processor, cause the electronic device to determine the category information of the first search text based on at least one of a preference for the first search text received from the external electronic device or a preference for a user of the electronic device.

8. The electronic device of claim 6, wherein the instructions, when executed by the processor, cause the electronic device to:
   ascertain at least one of a search frequency and an access frequency of searches and accesses performed using the plurality of websites; and
   display the recommendation list containing the plurality of websites arranged in descending order of the frequency based on the ascertained frequency on the display.

9. A search keyword processing method of an electronic device, the method comprising:
   displaying a first webpage associated with a first website including a search box on a display using a web browser;

displaying, in response to receiving a first search text, the received first search text in the search box of the first webpage;

transmitting the first search text to a first external server associated with the first webpage via a communication circuit in response to detecting a first input for performing a search using the first search text;

receiving a first search result associated with the search text from the first external server;

comparing category information of the first webpage and category information of the first search text with category information of at least one webpage to be stored in a memory and an external electronic device;

determining a plurality of websites having category information similar to the category information of the first webpage and the category information of the first search text among the at least one website stored in the memory and the external electronic device;

displaying the first search result associated with the first search text and a recommendation list including the determined plurality of websites, wherein the determined plurality of websites is search engines different from the first webpage;

receiving a second input selecting a second website of the plurality of websites included in the recommendation list to perform another search using the first search text, without further receiving a second search text;

transmitting the first search text to a second external server associated with the selected second website via the communication circuit in response to receiving the second input;

receiving a second search result associated with the first search text from the second external server; and displaying a second webpage including the second search result associated with the first search text on the display, wherein the recommendation list further includes a plurality of websites having category information identical to the category information of the first webpage and the category information of the first search text among the at least one web site stored in the memory and the external electronic device.

10. The method of claim 9, further comprising displaying, after receiving the first search result, at least one icon, text, and/or symbol representing the plurality of websites on the display.

11. The method of claim 9, further comprising:
displaying, after receiving the first search result, a text string in a uniform resource locator (URL) address bar; and
extracting at least part of the first search text from the text string.

12. The method of claim 9, further comprising:
analyzing, after receiving the first search result, a hypertext markup language (html) of a webpage including the first search result; and
extracting at least part of the first search text from the analyzed html.

13. The method of claim 9, further comprising decoding, after receiving the first search result, information encoded based on an encoding processing scheme of the first website corresponding to the first webpage and extracting the decoded information from the text string presented in a URL address bar.

14. The method of claim 9, wherein the recommendation list includes the determined plurality of websites with the category information similar to at least one of the category information of the first webpage and the category information of the first search text on the display.

15. The method of claim 9, further comprising determining the category information of the first search text based on at least one of a preference for the first search text received from the external electronic device or a preference for a user of the electronic device.

16. The method of claim 14, wherein displaying the recommendation list comprises:
arranging the plurality of websites based on a predetermined manner;
ascertaining at least one of a search frequency and an access frequency of searches and accesses performed using the plurality of websites; and
displaying the recommendation list containing the plurality of websites arranged in descending order of the frequency based on the ascertained frequency.

* * * * *